United States Patent [19]
Chen et al.

[11] Patent Number: 5,134,658
[45] Date of Patent: Jul. 28, 1992

[54] APPARATUS FOR DISCRIMINATING INFORMATION SIGNALS FROM NOISE SIGNALS IN A COMMUNICATION SIGNAL

[75] Inventors: Herbert M. Chen; Alan F. Hendrickson, both of Austin, Tex.

[73] Assignee: Advanced Micro Devices, Inc., Sunnyvale, Calif.

[21] Appl. No.: 589,315

[22] Filed: Sep. 27, 1990

[51] Int. Cl.$^5$ .................. H04B 15/00; G10L 9/06
[52] U.S. Cl. ....................... 381/46; 381/110; 381/121
[58] Field of Search ............ 381/46, 47, 110, 121; 340/110

[56] References Cited

U.S. PATENT DOCUMENTS

| | | | |
|---|---|---|---|
| 3,513,260 | 10/1967 | Hellwarth | 381/46 |
| 3,865,986 | 2/1975 | Darwood | 381/46 |
| 3,873,926 | 3/1975 | Wright | 381/110 |
| 4,000,369 | 12/1976 | Paul, Jr. et al. | 381/46 |
| 4,359,604 | 11/1982 | Dumont | 381/110 |
| 4,484,344 | 11/1984 | Mai et al. | 381/46 |
| 4,754,486 | 6/1988 | Stafford et al. | 381/110 |
| 4,845,757 | 7/1989 | Wagner | 381/121 |
| 4,918,734 | 4/1990 | Muramatsu et al. | 381/46 |
| 4,926,484 | 5/1990 | Nakano | 381/46 |
| 4,965,835 | 10/1990 | Hochstein | 381/110 |
| 5,036,540 | 7/1991 | Eastmond | 381/47 |

Primary Examiner—Dale M. Shaw
Assistant Examiner—David D. Knepper
Attorney, Agent, or Firm—Foley & Lardner

[57] ABSTRACT

The preferred embodiment of the apparatus comprises a first signal level detector which receives the communications signal as an input and generates a detection signal as an output, a second signal level detector which receives the detection signal as an input and generates a noise detection signal as an output, and a comparing circuit which compares the detection signal and the noise detection signal and produces a speech burst detection signal. Each of the signal level detectors comprises a digital low pass filter having an input and an output which employs a comparator for comparing current samples of signals at the input with previous samples of signals at the output and generating a representative comparator output. Each low pass filter includes circuitry for establishing an attack time and a decay time, in response to the comparator output. The attack time and the decay time in the first signal level detector being established as a fast attack time and a slow decay time relative to the attack time and the decay time in the second signal level detector.

18 Claims, 4 Drawing Sheets

APPARATUS FOR DISCRIMINATING INFORMATION SIGNALS FROM NOISE SIGNALS IN A COMMUNICATION SIGNAL

CROSS REFERENCE TO RELATED APPLICATIONS

The following applications contain subject matter similar to the subject matter of this application.

U.S. patent application Ser. No. 07/589,330, filed Sep. 27, 1990, now U.S. Pat. No. 5,075 entitled "Apparatus for Facilitating Communcations"; and U.S. patent application Ser. No. 07/589,402, filed Sep. 27, 1990, now U.S. Pat. No. 5,021,783 entitled "Method for Operating an Apparatus for Facilitating Communcations".

BACKGROUND OF THE INVENTION

The present invention is directed to an apparatus for discriminating information signals from noise signals within a communication signal. The present invention, in its preferred embodiment, is intended for use with circuitry for facilitating communications between an analog device and a digital device, such as a hands-free speaker phone controller associated with a telephone system.

A significant portion of telephone equipment manufacturing costs may be attributable to parts and equipment assembly. One approach to reducing costs is to provide a low-cost part which requires no external components. Incorporation of external components into an integrated circuit generally yields a device which is more stable in its operation, has good sensitivity, and is consistent in its performance.

Additional advantages are realized when the integrated circuit is a digital circuit. Principal among such additional advantages are even further improved stability and programmability of various operational parameters associated with the circuitry. Digital programmability provides a versatile circuitry which may be easily tailored to be applicable to a wide variety of operational environments using a single integrated design. As a result, the development costs and manufacturing costs associated with the circuitry are much reduced since they are able to be spread across a wider variety of products.

The present invention is an apparatus for use with a communications system for facilitating communications between an analog device and a digital device, such as hands-free controlled speaker phone circuitry, associated with a digital telephone system.

In its preferred embodiment, the apparatus of the present invention provides precise speech level and background noise level signal detection. Further, the present invention provides for precise speech burst detection, precise attack time and decay time for speech detection, and software programmability of a variety of operational parameters.

SUMMARY OF THE INVENTION

The invention is an apparatus for discriminating information signals from noise signals within a communication signal. The apparatus of the preferred embodiment of the present invention comprises a first signal level detector, a second signal level detector, and a comparing circuit. Each of the signal level detectors comprises a digital low pass filter which employs a comparator for comparing current signal samples with previous samples and generating a comparator output representative of that comparing. Each low pass filter has an attack time characteristic and a decay time characteristic, each of which characteristics is determined by an operational coefficient, the operational coefficient being responsive to the comparator output. The first signal level detector receives the communications signal as an input and generates an information level detection signal as an output; the second signal level detector receives the information level detection signal as an input and generates a noise level detection signal as an output.

The comparing circuit compares the output of the first signal level detector and the output of the second signal level detector and produces a speech burst detection signal in response to that comparison.

The operational coefficient is valued in the first signal level detector to establish a fast attack time and a slow decay time relative to the attack time and decay time of the second signal level detector, and the coefficient is valued in the second signal level detector to establish a slow attack time and a fast decay time relative to the attack time and decay time in the first signal level detector. In the preferred embodiment of the present invention, the operational coefficient is digitally programmable.

In its preferred embodiment, the apparatus is an integrated digital circuit having a variety of programmable operational parameters.

It is, therefore, an object of the present invention to provide an apparatus for discriminating information signals from noise signals within a communication signal which enables precise speech level detection.

A further object of the present invention is to provide an apparatus for discriminating information signals from noise signals within a communication signal which allows precise background noise level detection.

Yet a further object of the present invention is to provide an apparatus for discriminating information signals from noise signals within a communication signal which enables precise speech burst detection.

A still further object of the present invention is to provide an apparatus for discriminating information signals from noise signals within a communication signal which has a programmable speech burst threshold capability.

Another object of the present invention is to provide an apparatus for discriminating information signals from noise signals within a communication signal which is configured to allow programmable precision attack time and programmable precision decay time parameters.

Yet another object of the present invention is to provide an apparatus for discriminating information signals from noise signals within a communication signal which is inexpensive to manufacture.

Further objects and features of the present invention will be apparent from the following specification and claims when considered in connection with the accompanying drawings illustrating the preferred embodiment of the invention.

DETAILED DESCRIPTION OF THE DRAWINGS

Figure 2:
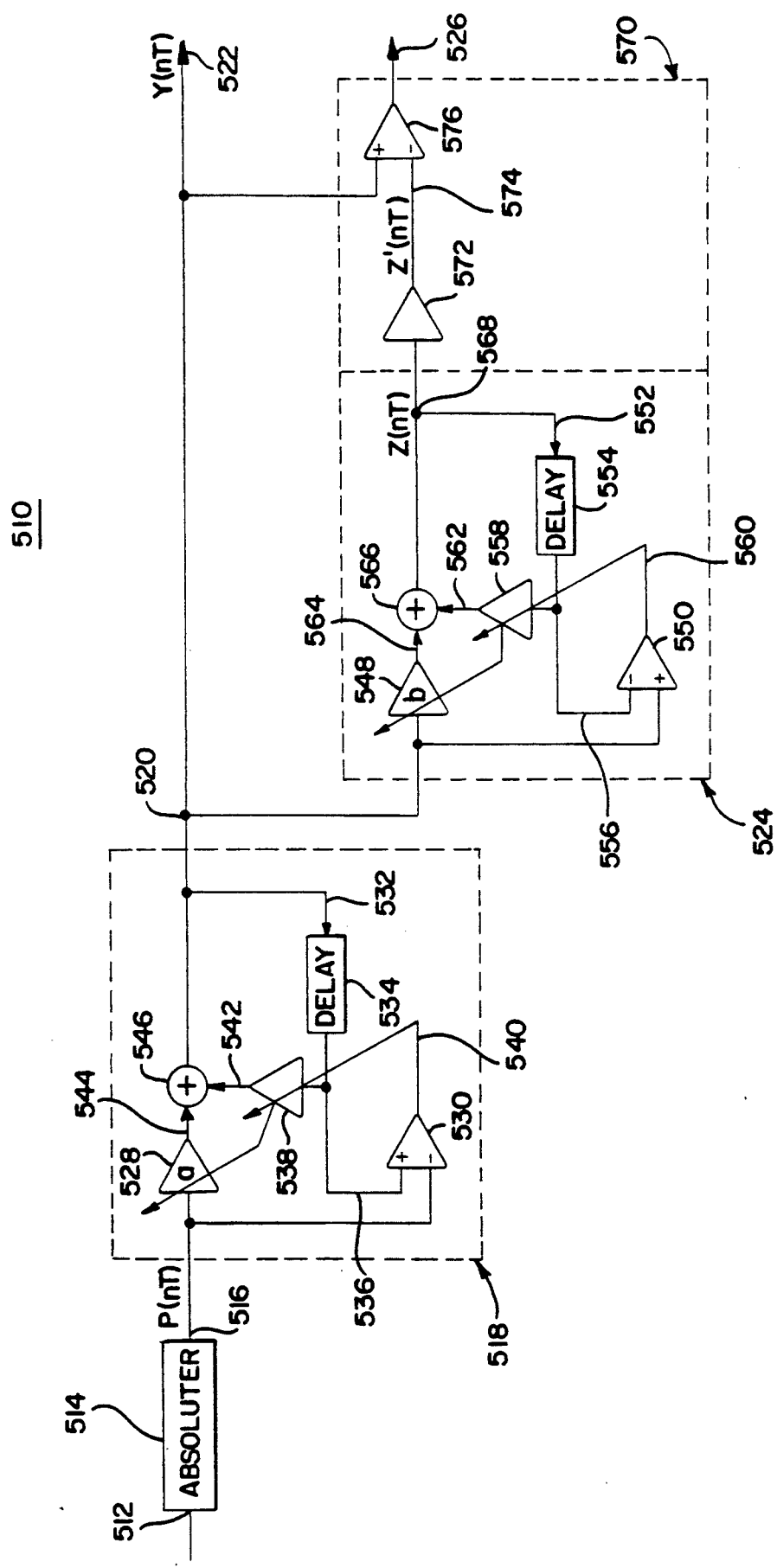
FIG. 2 is a schematic diagram of a first embodiment of the present invention.
Figure 4:
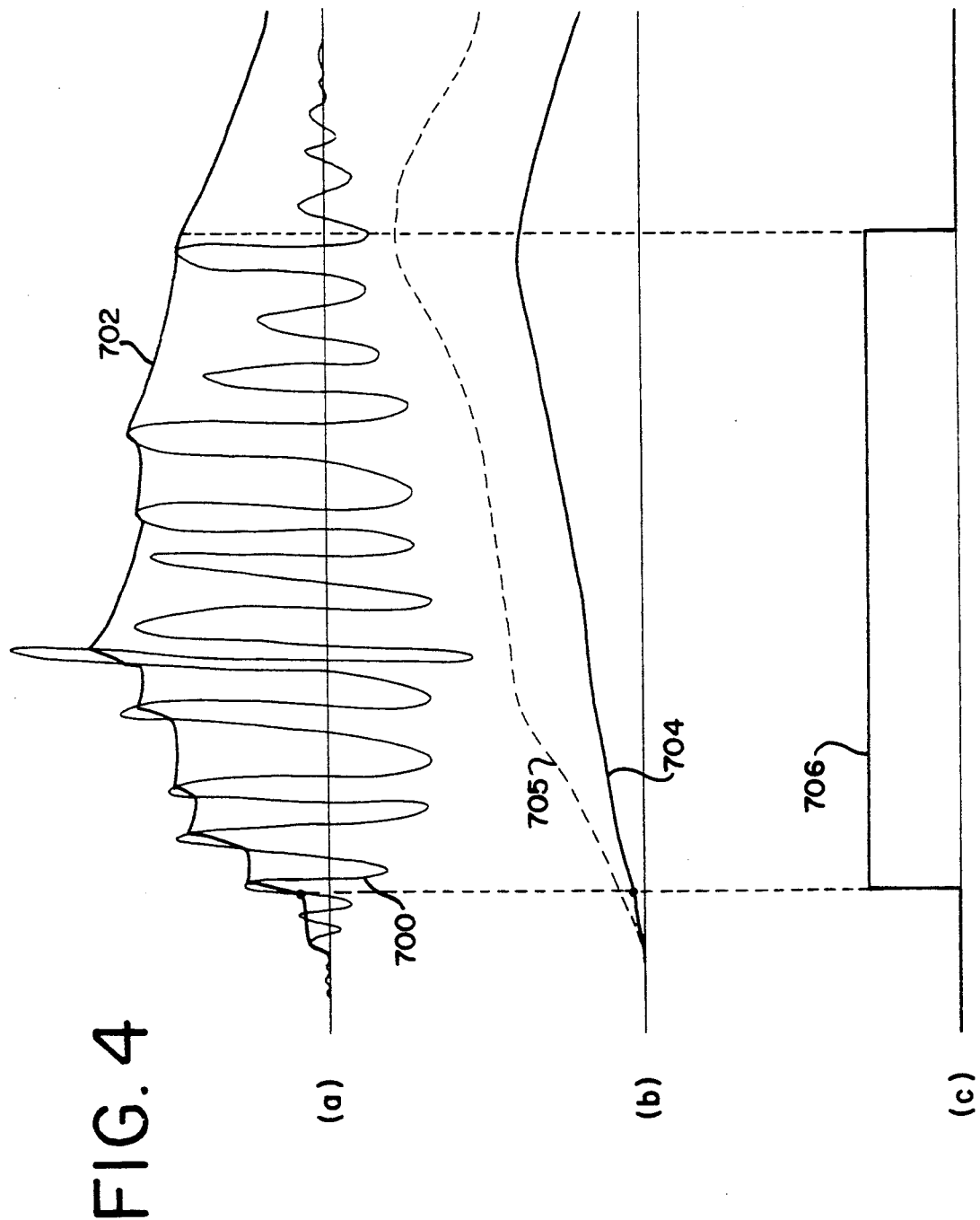

FIG. 4 (a)–(c) are illustrations of representative signal wave forms in various loci within the apparatus of FIG. 2.

DETAILED DESCRIPTION OF THE INVENTION

Figure 1:
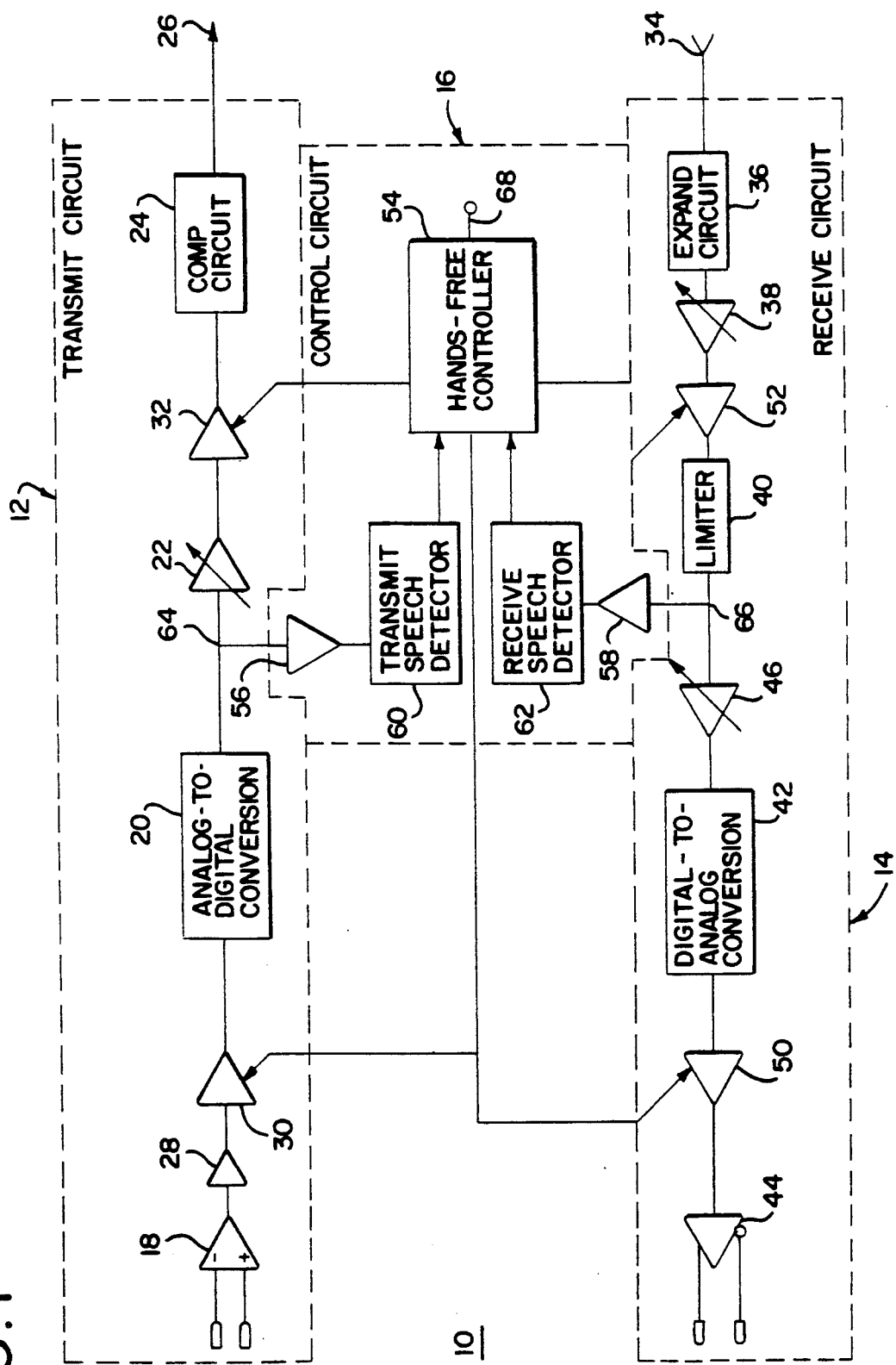
FIG. 1 is a schematic diagram of an apparatus incorporating the preferred embodiment of the present invention.

In FIG. 1, an apparatus 10 for facilitating communications between an analog device (not shown) and a digital device (not shown) is illustrated.

The apparatus 10 includes a transmit circuit 12, a receive circuit 14, and a control circuit 16.

Transmit circuit 12 includes an analog input 18 from an analog device (not shown), such as a microphone or the like, an analog-to-digital conversion circuit 20, a programmable gain amplifier 22, and a compression circuit 24 for compressing digital signals prior to passing the digital outgoing signals to a digital device (not shown), such as a digital telephone circuit, at output 26. Also included in transmit circuit 12 are an analog attenuator 30 and a digital attenuator 32. A booster amplifier 28 is included before analog attenuator 30 to increase the signal-to-noise ratio of the outputting signal before it is treated by analog attenuator 30 or analog-to-digital conversion circuit 20.

Receive circuit 14 receives digital signals from a digital device (not shown), such as a digital telephone network, at digital input 34. The received digital incoming signal is expanded by an expanding circuit 36 and is amplified by a programmable gain amplifier 38. Also included in receive circuit 14 is a limiter circuit 40 to limit excursion of the digital incoming signal, a digital-to-analog conversion circuit 42, and an analog output 44. Analog output 44 is connected to an analog output device (not shown), such as a loudspeaker, or the like. Also included in receive circuit 14 are an analog attenuator 50 and a digital attenuator 52.

Control circuit 16 includes a hands-free controller circuit 54, an amplifier 56, and amplifier 58, a transmit speech detector 60, and a receive speech detector 62. Thus, control circuit 16 samples outgoing digital signals at junction 64 and samples incoming digital signals at junction 66.

In operation, transmit circuit 12 accepts an outgoing signal as a differential analog input from a microphone (not shown) through analog input 18, performs analog-to-digital conversion of the outputting signal by analog-to-digital conversion circuit 20, compresses the then-digital output signal by compression circuit 24, and presents the compressed digital output signal at digital output 26. The output signal also passes through analog attenuator 30 and digital attenuator 32, both of which are under control of hands-free controller circuit 54. Booster amplifier 28 boosts the outgoing analog signal level before analog-to-digital conversion circuit 20 performs its analog-to-digital conversion in order to improve conversion performance. Similarly, programmable gain amplifier 22 is placed in transmit circuit 12 before digital attenuator 32 in order that a user may adjust the final signal level of the outgoing digital signal, thereby further allowing for minimization of distortion and noise in the output digital signal produced at digital output 26.

Receive circuit 14 accepts compressed digital incoming signals at digital input 34, expands the incoming digital signal by expanding circuit 36, passes the incoming digital signal through limiter 40, and performs digital-to-analog conversion by digital-to-analog conversion circuit 42 in order to provide an incoming analog signal to a loudspeaker (not shown) through analog output 44. The incoming signals also pass through digital attenuator 52 and analog attenuator 50, both of which are controlled by hands-free controller circuit 54.

A programmable gain amplifier 38 and limiter 40 are placed before junction 66, the point at which incoming signals are sensed by control circuit 16, in order that hands-free controller circuit 54 can fairly compare outgoing transit signals and incoming receive signal levels.

Programmable amplifier 46 is provided in order to compensate for loudspeaker sensitivity, which measures output loudness for a given electric input. Programmable amplifier 46 is placed after junction 66, the sensing point for incoming signals for control circuit 16, so that programmable amplifier 46 does not affect one-to-one comparison by control circuit 16 of outgoing signals and incoming signals. Further, programmable gain amplifier 46 is placed before digital-to-analog conversion circuit 42 in order to optimize performance of digital-to-analog conversion circuit 42.

Transmit speech detector 60 samples signals from transmit circuit 12 and receive speech detector 62 samples signals from receive circuit 14. Amplifiers 56, 58 scale transmit signal levels and receive signal levels, respectively. Transmit speech detector 60 and receive speech detector 62 output to hands-free controller circuit 54 their respective scaled sampled transmit and receive signals. Additionally, transmit speech detector 60 and receive speech detector 62 provide to hands-free controller circuit 54 an indication of whether the respective sampled transmit and receive signals comprise a speech signal or a noise signal.

Signals of fairly constant amplitude over a 150 millisecond interval are generally presumed by the preferred embodiment of the present invention to be noise signals.

Hands-free controller circuit 54 accepts the respective scaled sampled transmit and receive signal level information, as well as speech or noise signal type indications, from transmit speech detector 60 and receive speech detector 62. Information thus received is used by hands-free controller circuit 54 to determine allocation of losses among the various attenuators 30, 32, 50, 52.

Hands-free controller circuit 54 provides three stable states and four transitional states of operation for the preferred embodiment of the present invention.

Preferably, the three stable states are idle, transmit, and receive; and the four transitional states are transmit-up, receive-up transmit-down, and receive-down.

In the transmit stable state, analog attenuator 30 and digital attenuator 32 are forced to zero decibel loss, and analog attenuator 50 and digital attenuator 52 are forced to a programmable maximum loss. In such manner, hands-free controller circuit 54 allows the outgoing signal to pass through transmit circuit 12 without loss (theoretically), while any incoming signal received at digital input 34 is suppressed by subjecting it to a programmable maximum loss.

In the receive stable state, on the other hand, analog attenuator 50 and digital attenuator 52 are forced to zero decibel loss, and analog attenuator 30 and digital attenuator 32 are forced to a programmable maximum loss in order that losses may be distributed to the transmit circuit 12 while allowing (theoretical) loss-free passage of incoming signals through receive circuit 14.

In the idle stable state, each attenuator 30, 32, 50, 52 is forced to one-half the maximum programmable loss. In such a configuration, the apparatus is equally disposed to respond to transmit (outgoing) signals and to receive (incoming) signals.

Throughout operation of the preferred embodiment of the present invention digital attenuators 32, 52 may be modified according to volume control values programmed in hands-free controller circuit 54.

The four transitional states established by hands-free controller circuit 54 are provide to ensure smooth transitions among the three stable states. During such transitions among the three stable states, losses in each attenuator 30, 32, 50, 52 are incremented or decremented appropriately to effect the correct transition, preferably in a series of 1.5 decibel steps, until a stable state is achieved by apparatus 10.

In the preferred embodiment of the present invention, the losses among the various attenuators 30, 32, 50, 52 are distributed according to several rules: first, losses in analog attenuator 30 and analog attenuator 50 always sum to a constant, which constant is the programmable maximum loss. Further, losses in digital attenuator 32 and digital attenuator 52 sum to the same constant. Such conditions guarantee stability during voice switching operations and assist in ensuring linear analog-to-digital conversion.

Second, at any given time, losses in analog attenuator 30 and digital attenuator 32 are the same and losses in analog attenuator 50 and digital attenuator 52 are the same. This second requirement allows hands-free controller circuit 54 to perform an unbiased comparison of transit (outgoing) signal levels and receive (incoming) signal levels, thereby simplifying control circuitry within hands-free controller circuit 54.

Total loss control by hands-free controller circuit 54 in each of transmit circuit 12 and receive circuit 14 is split evenly between attenuators 30, 32 and attenuators 50, 52 for several reasons. First, such even distribution of losses allows a two point sensing structure by providing a reliably detectable signal level at junctions 64, 66 in a configuration which is easily stabilized. As an additional benefit, cost of manufacture also decreases because any requirement for additional sensing points is eliminated. Further, even distribution between attenuators 30, 32 and attenuators 50, 52 provides an automatic voice control hysteresis which defines the ability of a receive speaker to override a transmit speaker, and vice versa. Third, such even distribution helps prevent clipping distortion in the analog-to-digital conversion process as well as increases resolution of such conversion. Finally, such even distribution enhances stability of the idle state so that hands-free controller circuit 54 may make an unbiased comparison of transmit (outgoing) signal levels and receive (incoming) signal levels.

A further advantage of the all-digital circuitry of apparatus 10 is a capability to provide an interface 68 with a microprocessor (not shown). Interface 68 provides access for a microprocessor to automatically monitor the state of hands-free controller circuit 54 and provides access for a microprocessor to force hands-free controller circuit 54 to any given state by a register write to alter operational parameters utilized by hands-free controller circuit 54. It is precisely by such an access as may be provided by interface 68 that a microprocessor may be used to program operational parameters of a given apparatus 10 to adapt apparatus 10 to accommodate different operating environments. That is, change in applicability of apparatus 10 to accommodate different operating environments may be effected through using software to vary parameters rather than by changing hardware. Indeed, such programmability allows operational parameters to be changed during the actual operation of a phone. Thus, alteration of operational parameters may, for example, enable the apparatus 10 to function as a normal full-duplex telephone, a simple transmitter, a simple receiver, or in its normal speaker phone function by employing software programming to change operational parameters.

The present invention is an apparatus appropriate for employment as transmit speech detector 60 or receive speech detector 62 of apparatus 10.

FIG. 2 is a schematic diagram of a first embodiment of the present invention. In FIG. 2, an apparatus 510 for discriminating information signals from noise signals within a communication signal is illustrated. A digital input signal is applied to apparatus 510 at input 512 of an absoluter 514. Accordingly, absoluter 514 produces an output at 516 which comprises the absolute value of the signal applied at input 512.

The signal appearing at output 516 is applied to a first signal level detector circuit 518. First signal level detector circuit 518 produces an output at juncture 520. The signal present at juncture 520 represents a speech level detector signal $y(nT)$ and is produced as an output of apparatus 10 at output 522, as well as being applied as an input to a second signal level detector circuit 524.

Second signal level detector circuit 524 produces a signal at output 526 which is an indication of speech burst detection.

First signal level detector circuit 518 is comprised of a gain block 528 which receives the signal at output 516. The signal at output 516 is also applied to the negative input of a comparator 530.

A feedback line 532 is operatively connected in common with junction 520 and to a one sample period delay circuit 534. One sample period delay circuit 534 delays the signal present at juncture 520 by one sample period and applies that delayed signal on line 536 to the positive input of comparator 530 as well as to the input of a gain block 538. Thus, first signal level detector circuit 518 is an adaptive IIR low pass filter with a dynamically controlled pole location (i.e., time constant of the filter impulse response), which dynamic control is effected by the output 540 of comparator 530. The output 542 of gain block 538 and the output 544 of gain block 528 are each applied to a summer 546. Summer 546 sums the two gain block output signals 542, 544 to produce output signal $y(nT)$ at juncture 520.

Referring briefly to FIG. 4, FIGS. 4(a)–(c) illustrate representative signals at various loci within apparatus 10, illustrated at FIG. 2. Specifically, FIG. 4(a) illustrates signal wave forms involved in the portion of apparatus 510 described thus far. That is, in FIG. 4(a), in response to an input signal 700 at input 512 of absoluter 514, output 520 of first signal level detector circuit 518 will appear as signal 702 of FIG. 4(a).

Referring to FIG. 2, this is so because gain blocks 528, 538 have associated therewith a coefficient which determines the respective attack times and decay times of first signal level detector circuit 518. For first signal level detector circuit 518 the coefficient is chosen specifically to provide a fast attack time and slow decay time to produce a signal as signal 702 of FIG. 4(a).

Specifically, the mathematical description of the function of the first signal level detector circuit 518 is:

$$y(nT)=a^*p(nT)+(1-a)^*y)nT-T),$$

where a is the coefficient associated with gain block 528, and the coefficient associated with gain block 538 (which is responsive to output 540 of comparator 530) is (1−a). The choice of the coefficient a is preferably made as follows: if p(nT)≧y(nT−T) then a=0.0625, and if p(nT)<y(nT−T), then a=0.002.

Second signal level detector circuit 524 is constructed substantially the same as first signal level detector 518. Second signal level detector circuit 524 receives speech level detection signal y(nT) which is present at juncture 520 as an input to a gain block 548, as well as to the positive input of a comparator 550. A feedback line 552 is provided to a one sample period delay circuit 554. One sample period delay circuit 554 provides an output on line 556 to the negative input of comparator 550 as well as to the input of gain blocks 558 and 548. The output 560 of comparator 550 dynamically controls the pole position of second signal level detector circuit 524. Output 562 of gain block 558 is added with output 564 of gain block 548 by summer 566 to produce an output of second signal level detector circuit 524 at juncture 568. The output at juncture 568 is applied as an input to a comparing circuit 570.

Referring briefly again to FIG. 4, wave form 704 illustrated in FIG. 4(b) is representative of the wave form of the signal present at juncture 568 of apparatus 510.

As reference to FIG. 2 reveals, this is so because the coefficients of gain block 548 and gain block 558 are chosen to ensure that second signal level detector circuit 524 has a slow attack time and a fast decay time relative to the attack time and decay time of first signal level detector circuit 518. Thus, the mathematical description of the operation of second signal level detector circuit 524 is:

$$z(nT)=b^*y(nT)+(1-b)^*z)nT-T),$$

where b is the coefficient associated with gain block 548, and (1−b) is the coefficient associated with gain block 558. The choice of the coefficient b is preferably made as follows: if y(nT)≧z(nT−T) then b=0.002, and if y(nT)<z(nT−T), then b =0.0625.

Comparing circuit 570 includes a gain block 572 which is employed to set sensitivity of burst detection control associated with the signal z(nT) present at juncture 568. Gain block 572 produces an output z'(nT) at line 574 which is applied as the negative input to a comparator 576. Output z'(nT) is represented as a threshold signal 705 in FIG. 4(b). The positive input to comparator 576 is the speech level detection signal y(nT) present at juncture 520.

The output 526 of comparator 576 is illustrated in FIG. 4(c) as signal 706 and comprises a digital pulse which is initiated by the surpassing by signal 702 of threshold signal 705 (which is set by the sensitivity control imposed by gain block 572) and ceases at the point where signal 705 becomes equal to signal 702 (signal 702 representing speech level detection signal y(nT), and signal 705 representing a multiple of noise level detection signal z(nT)).

The fast attack time and slow decay time established by the representative choices of the coefficient a in connection with first signal level detector circuit 518 ensure that relatively rapid changes in signal level, which types of signals are associated with speech representing signals, are detected and responded to. The slow attack time and fast decay time established for second signal level detector circuit 524 by appropriate choice of the coefficient b ensures that second signal level detector circuit 524 responds to longer-term variations signal levels, such as are characteristic of background noise signals. Thus, the signal y(nT) present at juncture 520 is representative of speech level detection, and the signal z(nT) present at juncture 568 is representative of background noise signal levels. Accordingly, output 526 of comparator 576 represents the presence of a speech burst where speech level detection signal y(nT) exceeds background noise level detection signal z'(nT).

Figure 3:
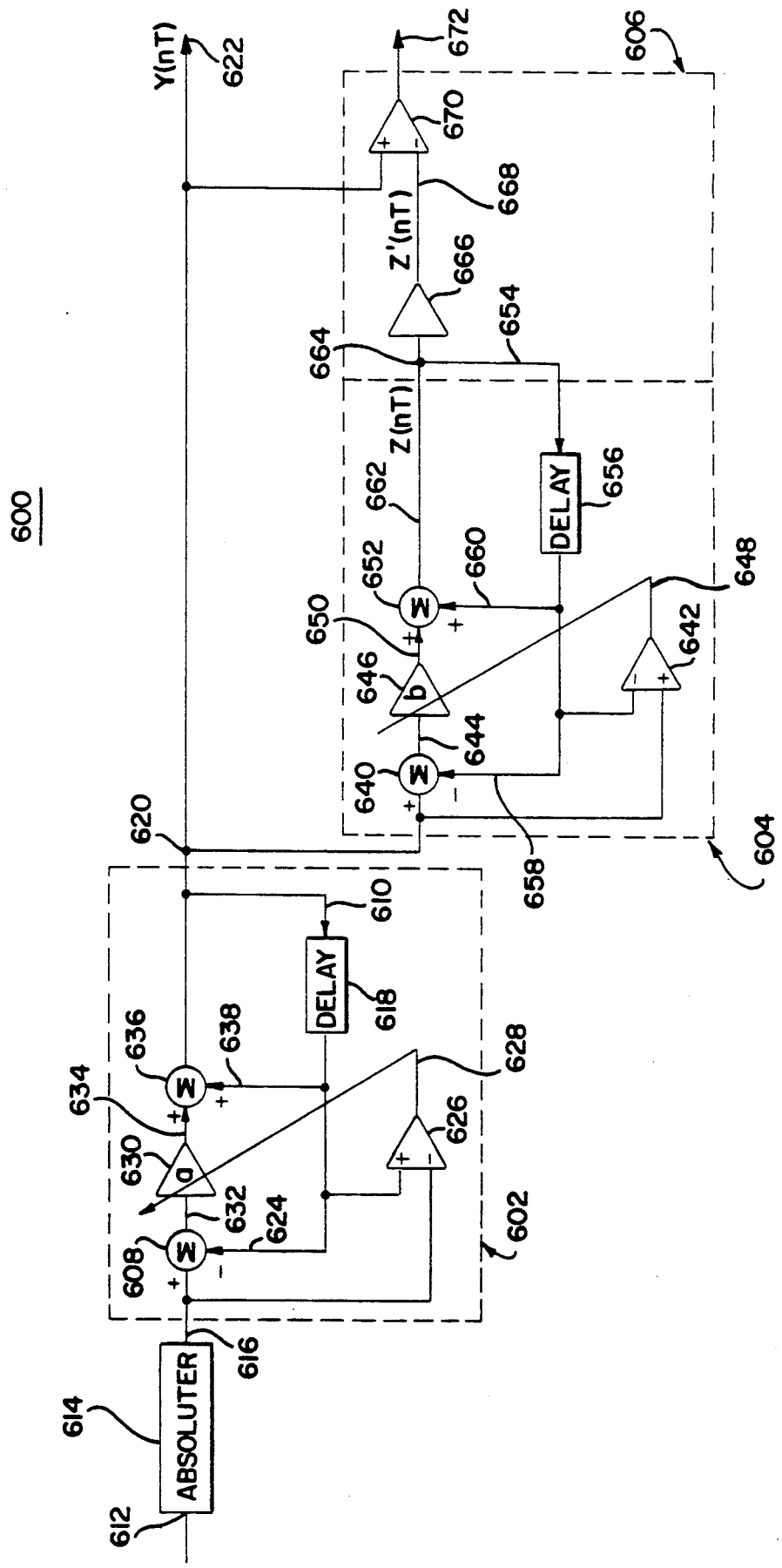
FIG. 3 is a schematic diagram of the preferred embodiment of the present invention.

FIG. 3 is a schematic diagram of the preferred embodiment of the present invention.

Referring to FIG. 3 an apparatus 600 is illustrated having a first signal level detector circuit 602, a second signal level detector circuit 604, and a comparing circuit 606.

First signal level detector circuit 602 is an equivalent circuit of first signal level detector circuit 518 of FIG. 2. First signal level detector circuit 518 of FIG. 2 might establish an unstable loop if f(a)+f(1−a)>1, where f(x) is the digital representation of real number x. However, first signal level detector circuit 602 of FIG. 3 avoids such a potential for unstable operation.

A digital input signal is applied to input 612 of an absoluter 614 and an absolute value representation of the digital input signal at input 612 is produced at output 616 of absoluter 614. A digital speech level detection signal y(nT) is produced at juncture 620 and provided at output 622.

Second signal level detector circuit 604 is similar in construction to first signal level detector circuit 602. Second signal level detector circuit 604 is an improvement over second signal level detector circuit 524 of FIG. 2 in its avoidance of a potential unstable operational mode if the coefficient b is improperly chosen, similar to the reason that first signal level detector circuit 602 improves over first signal level detector circuit 518 of FIG. 2.

Accordingly, first signal level detector circuit 602 is comprised of a subtractor 608 to which is applied the output of absoluter 614 and a one sample period delay signal provided via line 610, one sample period delay circuit 618, and line 624. The output of absoluter 614 is also applied to the negative input of comparator 626. The one sample period delay signal is applied to the positive input of comparator 626, and the output 628 of comparator 626 adjusts the gain of gain block 630, thereby altering the pole position of first signal level detector circuit 602. Gain block 630 receives as its input the output 632 of subtractor 608. The output 634 of gain block 630 is applied to summer 636; the one sample period delay signal is also applied to summer 636 by line 638. The output of summer 636 is speech level detection signal y(nT) at juncture 620.

Speech level detection signal y(nT) is applied as an input to second signal level detector circuit 604 at subtractor 640, as well as applied at the positive input of comparator 642. The output 644 of subtractor 640 is applied to a gain block 646. The output 648 of comparator 642 dynamically adjusts the gain of gain block 646, thereby altering the pole position of second signal level detector circuit 604. The output 650 of gain block 646 is applied to a summer 652. A one sample period delay signal is applied via line 654, one sample period delay circuit 656, and line 658 to subtractor 640. The one sample period delay signal is also applied to summer 652 by line 660. Further, the one sample period delay signal is applied to the negative input of comparator 642.

Thus, the output 662 of summer 652 comprises the background noise level detection signal z(nT) at juncture 664.

A gain block 666 is included in comparing circuit 606 to set sensitivity of burst detection and the output 668 of gain block 666 (a sensitized background noise level detection signal z'(nT)) is applied to the negative input of a comparator 670. Speech level detection signal y(nT) is applied to the positive input of comparator 670, so that the output 672 of comparator 670 comprises speech burst detection signal 706, as represented in FIG. 4(c).

It is to be understood that, while the detailed drawings and specific examples given describe preferred embodiments of the invention they are for the purpose of illustration only, that the apparatus of the invention is not limited to the precise details and conditions disclosed and that various changes may be made therein without departing from the spirit of the invention which is defined by the following claims:

We claim:

1. An apparatus for discriminating information signals from noise signals within a communication signal; the apparatus comprising:

a first signal level detector means for detecting signal levels, said first signal level detector means receiving said communication signal as an input and generating an information level detection signal as an output; and a second signal level detector means for detecting signal levels, said second signal level detector means receiving said communication level detection signal as an input and generating an information threshold detection signal as an output;

said first signal level detector means and said second signal level detector means each comprising a digital low pass filter having an input and an output, each said low pass filter employing comparator means operatively connected with said input and with said output for comparing current samples of signals present at said input with previous samples of signals present at said output and generating a comparator output representative of said comparing;

each said low pass filter including signal modifying means for modifying signals, said signal modifying means being responsive to said comparator output for establishing an attack time and a decay time;

said attack time and said decay time in said first signal level detection means being established as a fast attack time and a slow decay time relative to said attack time and said decay time in said second signal level detection means.

2. An apparatus for discriminating information signals from noise signals within a communication signal as recited in claim 1 wherein said signal modifying means is digitally programmable.

3. An apparatus for distinguishing speech-representing signals from noise signals within a communication signal; the apparatus comprising:

a first low pass filter means for detecting the presence and level of said speech-representing signals, said first low pass filter means receiving said communication signal as an input and producing a speech level detection signal as an output;

a second low pass filter means for detecting the presence and level of said noise signals, said second low pass filter means receiving said speech level detection signal as an input and producing a noise level detection signal as an output; and a comparator means for comparing signals, said comparator means receiving said speech level detection signal and said noise level detection signal and producing a speech burst detection signal as an output;

said first low pass filter means having a first means for establishing a first attack time and a first decay time;

said second low pass filter means having a second means for establishing a second attack time and a second decay time;

said first attack time being established as faster than said second attack time;

said first decay time being established as slower than said second decay time.

4. An apparatus for distinguishing speech-representing signals from noise signals within a communication signal as recited in claim 3 wherein said means for establishing said first attack time and said first decay time, and said means for establishing said second attack time and said second decay time are digitally programmable.

5. An apparatus for distinguishing speech-representing signals from noise signals within a communication signal as recited in claim 4 wherein said comparator means includes a threshold setting means for defining a threshold level for establishing sensitivity of said comparator means in producing said speech burst detection signal.

6. An apparatus for distinguishing speech-representing signals from noise signals within a communication signal as recited in claim 3 wherein said comparator means includes a threshold setting means for defining a threshold level for establishing sensitivity of said comparator means in producing said speech burst detection signal.

7. An apparatus for discriminating information signals from noise signals within a communication signal; the apparatus comprising:

a first digital filter means for filtering digital signals, said first digital filter means receiving said communications signal and generating a speech level detection signal, said speech level detection signal being the sum of a current sample of said communications signal modified by a first coefficient and a previous sample of said speech level detection signal modified by a second coefficient, said first coefficient and said second coefficient being determined by the difference between said current sample of said communications signal and said previous sample of said signal level detection signal;

a second digital filter means for filtering digital signals, said first digital filter means receiving said signal level detection signal and generating a noise level detection signal, said noise level detection signal being the sum of a current sample of said signal level detection signal modified by a third coefficient and a previous sample of said noise level detection signal modified by a fourth coefficient, said third coefficient and said fourth coefficient being determined by the difference between said current sample of said signal level detection signal and said previous sample of said noise level detection signal; and a comparing means for effecting comparison of signals, said comparing means effecting comparison of said signal level detection signal and said noise level detection signal and generating a speech burst detection signal representative of said comparison.

8. A digital apparatus for discriminating information signals from noise signals within a communications signal as recited in claim 7 wherein said second coefficient is substantially equal to one minus said first coefficient.

9. A digital apparatus for discriminating information signals from noise signals within a communications signal as recited in claim 8 wherein said fourth coefficient is substantially equal to one minus said third coefficient.

10. A digital apparatus for discriminating information signals from noise signals within a communications signal as recited in claim 7 wherein said fourth coefficient is substantially equal to one minus said third coefficient.

11. A digital apparatus for discriminating information signals from noise signals within a communications signal as recited in claim 7 wherein said first coefficient is assigned a first value when said current sample of said communications signal is greater than said previous sample of said signal level detection signal, and wherein said first coefficient is assigned a second value when said current sample of said communications signals is less than said previous sample of said signal level detection signal, said first value being greater than said second value.

12. A digital apparatus for discriminating information signals from noise signals within a communications signal as recited in claim 11 wherein said third coefficient is assigned said second value when said current sample of said signal level detection signal is greater than said previous sample of said signal level detection signal, and wherein said third coefficient is assigned said first value when said current sample of said signal level detection signal is less than said previous sample of said noise level detection signal.

13. A digital apparatus for discriminating information signals from noise signals within a communication signal; the apparatus comprising:

a first signal level detector means for detecting signal levels, said first signal level detector means receiving said communications signal and generating a signal level detection signal and including a first summing means for summing signals, a first delay means for delaying signals a first comparator means for comparing signals, and a first gain means for modifying gain of signals; said communications signal being operatively delivered to said first gain means and said first comparator means, said first delay means being operatively connected to receive said signal level detection signal and generate a previous sample of said signal level detection signal, said first comparator means comparing said communications signal and said previous sample of said signal level detection signal and generating a first comparison signal representative of said comparing, said first gain means receiving said first comparison signal and establishing a first coefficient and a second coefficient responsive to said first comparison signal, said first gain means modifying the gain of said communications signal by said first coefficient to generate a modified communications signal and said first gain means modifying the gain of said previous sample of said signal level detection signal by said second coefficient to generate a modified previous sample of said signal level detection signal, said first summing means receiving said modified communications signal and said modified previous sample of said signal level detection signal to generate said signal level detection signal;

a second signal level detector means for detecting signal levels, said second signal level detector means receiving said signal level detection signal from said first signal level detection means and generating a noise level detection signal and including a second summing means for summing signals, a second delay means for delaying signals, a second comparator means for comparing signals, and a second gain means for modifying gain of signals; said signal level detection signal being operatively delivered to said second gain means and said second comparator means, said second delay means being operatively connected to receive said noise level detection signal and generate a previous sample of said noise level detection signal, said second comparator means comparing said signal level detection signal and said previous sample of said noise level detection signal and generating a second comparison signal representative of said comparing, said second gain means receiving said second comparison signal and establishing a third coefficient and a fourth coefficient responsive to said second comparison signal, said second gain means modifying the gain of said signal level detection signal by said third coefficient to generate a modified signal level detection signal and said second gain means modifying the gain of said previous sample of said noise level detection signal by said fourth coefficient to generate a modified previous sample of said noise level detection signal, said second summing means receiving said modified signal level detection signal and said modified previous sample of said noise level detection signal to generate said noise level detection signal; and a comparing means for effecting comparison of signals, said comparing means effecting comparison of said signal level detection signal and said noise level detection signal and generating a speech burst detection signal representative of said comparison.

14. A digital apparatus for discriminating information signals from noise signals within a communications signal as recited in claim 13 wherein said second coefficient is substantially equal to one minus said first coefficient.

15. A digital apparatus for discriminating information signals from noise signals within a communications signal as recited in claim 14 wherein said fourth coefficient is substantially equal to one minus said third coefficient.

16. A digital apparatus for discriminating information signals from noise signals within a communications signal as recited in claim 13 wherein said fourth coefficient is substantially equal to one minus said third coefficient.

17. A digital apparatus for discriminating information signals from noise signals within a communications signal as recited in claim 13 wherein said first coefficient is assigned a first value when said current sample of said communications signal is greater than said previous sample of said signal level detection signal, and wherein said first coefficient is assigned a second value when said current sample of said communications signals is less than said previous sample of said signal level detection signal, said first value being greater than said second value.

18. A digital apparatus for discriminating information signals from noise signals within a communications signal as recited in claim 17 wherein said third coefficient is assigned said second value when said current sample of said signal level detection signal is greater than said previous sample of said signal level detection signal, and wherein said third coefficient is assigned said first value when said current sample of said signal level detection signal is less than said previous sample of said noise level detection signal.

* * * * *